JOHN C. JOHNSON.
Aerated Water-Fountains.
No. 127,243.              Patented May 28, 1872.
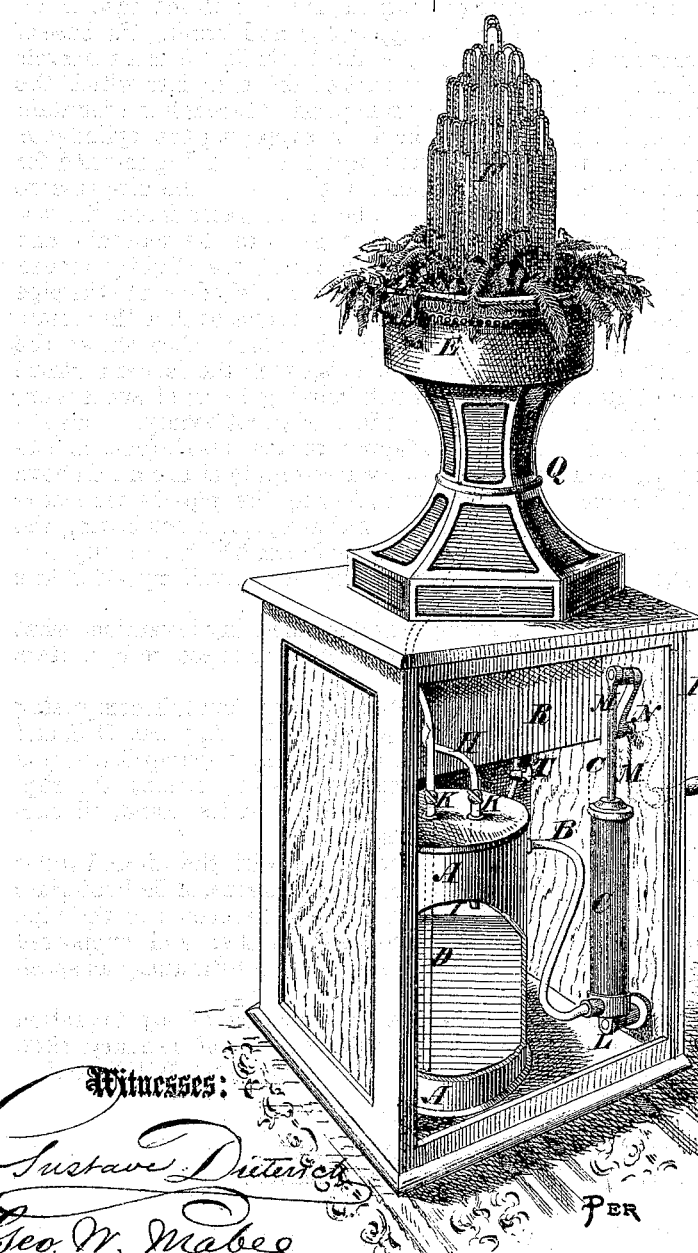
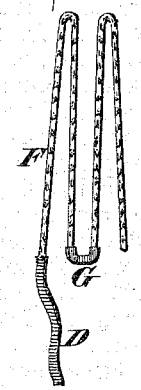

UNITED STATES PATENT OFFICE.

JOHN C. JOHNSON, OF LOUISVILLE, KENTUCKY.

IMPROVEMENT IN AERATED WATER-FOUNTAINS.

Specification forming part of Letters Patent No. 127,243, dated May 28, 1872.

Specification describing a new and Improved Crystal Fountain, invented by JOHN C. JOHNSON, of Louisville, in the county of Jefferson and State of Kentucky.

My invention consists of a crystal fountain for mixed water and air jets, in which a hollow water-cylinder and air-compression chamber for supplying the motive power with an air-pump for compressing the air, are combined with the air-mixing pipes and cocks and other apparatus of the fountain, and all inclosed in an ornamental case, comprising in whole a portable crystal fountain not dependent upon a permanent head of water, and so adapted for moving about the house from place to place, without disturbing or having to change the water-connections. My invention also comprises a cluster of bent pipes of glass to be used in place of the jets discharged into the air, in combination with the aforesaid apparatus, through which the mingled water and air are forced alternately up and down, producing scenic effects of great beauty.

Figure 1 is a perspective view of my improved fountain, partly in section; and Fig. 2 is a detail, showing the arrangement of the bent-glass tubes and pipe-connections.

Similar letters of reference indicate corresponding parts.

A is a hollow cylinder, which is to be partly filled with water, and has an air-pump connection, B, at the top, through which air is compressed in the space above the water by a pump, C. D is a water-pipe extending from the interior a short distance above the bottom up through the top to the bottom of the basin E, where it connects with one of the glass tubes F, which are supported by said basin, and connected as at G, so as to form a continuous course through all of them. H is an air-pipe extending from the air-space I of the hollow cylinder up through the top and connecting with the water-pipe D a short distance from the top of the cylinders. Below said junction each pipe, D and H, has a regulating-cock K. The air-pump is of the oscillating kind, mounted on a pivot, L, at its lower end, with its piston-rod M connected to a shaft, N, with a crank at both ends, and mounted in a bearing between said cranks, as shown, said bearing being in the wall of the case P inclosing the apparatus, and forming the base of the stand Q of the basin E. R is a reservoir in the upper part of the case, into which the water falls after passing through the fountain to be retained for supplying the cylinder A again through pipe T after being emptied for using the same water over. The air-pressure in the space I above the water forces the water up through pipe D to the fountain, and when both the cocks K are slightly opened the water and air alternately flow into the pipe above in regular pulsations, so that the stream flowing through the glass tubes shows the light air bubbles between the darker portions of water, which, moving in rapid succession, give scenic effect of great beauty. This air-condensing apparatus may also be used in connection with a water-supply from a head above the fountain by having the pipe D connected directly to the water-pipe, and not having the water enter the cylinder, which will only contain air, and I propose to avail myself of this arrangement.

Having thus described my invention, what I claim as new, and desire to secure by Letters Patent, is—

1. The portable crystal fountain comprising the water and air holder A, pipes D H and their regulating-cocks K, air-pump C, and pan R, all inclosed in a case, P, forming the support for the basin E and its stand, all substantially as specified.

2. The combination, with the air-and-water mixing and forcing apparatus, of the bent-glass tubes, the same being connected to the pipe D, and connected together and supported above the basin E, all substantially as specified.

The above specification of my invention signed by me this 27th day of January, 1872.

JOHN C. JOHNSON.

Witnesses:
GEO. W. MABEE.
ALEX. F. ROBERTS.